US011195353B2

(12) United States Patent
Nix et al.

(10) Patent No.: US 11,195,353 B2
(45) Date of Patent: Dec. 7, 2021

(54) METHODS, DEVICES, AND SYSTEMS FOR COMMUNICATING AUTONOMOUS-VEHICLE STATUS

(71) Applicant: UATC, LLC, San Francisco, CA (US)

(72) Inventors: Molly Castle Nix, San Francisco, CA (US); Sean Chin, Pittsburgh, PA (US); Eric James Hanson, San Francisco, CA (US); Philipp Haban, Pittsburgh, PA (US); Richard Brian Donnelly, Pittsburgh, PA (US); David Patrick Rice, Wexford, PA (US); Thomas Jeffery Watson, Jr., Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 411 days.

(21) Appl. No.: 15/882,372

(22) Filed: Jan. 29, 2018

(65) Prior Publication Data
US 2019/0221058 A1 Jul. 18, 2019

Related U.S. Application Data

(60) Provisional application No. 62/618,367, filed on Jan. 17, 2018.

(51) Int. Cl.
| G07C 5/12 | (2006.01) |
| G07C 5/08 | (2006.01) |
| G01S 7/51 | (2006.01) |
| G01S 7/481 | (2006.01) |
| G05D 1/00 | (2006.01) |
| G01S 17/931 | (2020.01) |
| G07C 5/00 | (2006.01) |

(52) U.S. Cl.
CPC .............. *G07C 5/12* (2013.01); *G01S 7/4813* (2013.01); *G01S 7/51* (2013.01); *G01S 17/931* (2020.01); *G05D 1/00* (2013.01); *G07C 5/0825* (2013.01); *G07C 5/008* (2013.01)

(58) Field of Classification Search
CPC ....................................................... G07C 5/12
See application file for complete search history.

(56) References Cited

U.S. PATENT DOCUMENTS

| 5,586,030 | A | * | 12/1996 | Kemner | ............... G05D 1/0257 340/909 |
| 6,812,851 | B1 | | 11/2004 | Dukach et al. | |
| 8,072,663 | B2 | | 12/2011 | O'Neill et al. | |
| 8,635,556 | B2 | | 1/2014 | Lalancette et al. | |
| 8,756,005 | B2 | | 6/2014 | Choi | |
| 8,954,252 | B1 | | 2/2015 | Urmson et al. | |
| 9,285,464 | B2 | | 3/2016 | Pennecot et al. | |

(Continued)

*Primary Examiner* — Michael A Berns
(74) *Attorney, Agent, or Firm* — Dority & Manning, P.A.

(57) ABSTRACT

The present disclosure is directed to communicating autonomous-vehicle status. In particular, the methods, devices, and systems of the present disclosure can: determine one or more maintenance statuses of one or more of multiple different systems of an autonomous vehicle; and depict at least one of the status(es) via a display device affixed to an exterior of the autonomous vehicle and configured to display information associated with the multiple different systems such that the information is visible to an observer located outside the autonomous vehicle.

20 Claims, 7 Drawing Sheets

(56) References Cited

U.S. PATENT DOCUMENTS

| | | | |
|---|---|---|---|
| 9,494,938 B1 | 11/2016 | Kemler et al. | |
| 9,716,762 B2* | 7/2017 | Petersen | H04L 67/12 |
| 9,904,375 B1* | 2/2018 | Donnelly | G01S 7/51 |
| 10,169,927 B2* | 1/2019 | Lilly | G07C 5/0808 |
| 10,386,835 B2* | 8/2019 | Vogt | G01C 21/3461 |
| 10,394,345 B2* | 8/2019 | Donnelly | G01S 17/89 |
| 10,523,880 B2* | 12/2019 | Gassend | G01S 17/89 |
| 2002/0005826 A1 | 1/2002 | Pederson | |
| 2003/0144906 A1 | 7/2003 | Fujimoto et al. | |
| 2004/0056779 A1 | 3/2004 | Rast | |
| 2005/0083403 A1 | 4/2005 | Flores et al. | |
| 2010/0157173 A1 | 6/2010 | Wang et al. | |
| 2019/0225233 A1* | 7/2019 | Tod | B60W 50/0205 |

* cited by examiner

METHODS, DEVICES, AND SYSTEMS FOR COMMUNICATING AUTONOMOUS-VEHICLE STATUS

PRIORITY CLAIM

This application claims priority to U.S. Patent Application Ser. No. 62/618,367, filed Jan. 17, 2018, and entitled "METHODS, DEVICES, AND SYSTEMS FOR COMMUNICATING AUTONOMOUS-VEHICLE STATUS," the disclosure of which is incorporated by reference herein in its entirety.

FIELD

The present disclosure relates generally to autonomous vehicles. More particularly, the present disclosure relates to communicating autonomous-vehicle status.

BACKGROUND

An autonomous vehicle is a vehicle that is capable of sensing its environment and navigating with minimal or no human input. In particular, an autonomous vehicle can observe its surrounding environment using a variety of sensors and identify an appropriate path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for communicating autonomous-vehicle status. The method can include determining one or more maintenance statuses of one or more of a plurality of different systems of an autonomous vehicle. The method can include depicting, via a display device affixed to an exterior of the autonomous vehicle and configured to display information associated with the plurality of different systems such that the information is visible to an observer located outside the autonomous vehicle, at least one of the one or more maintenance statuses.

Another example aspect of the present disclosure is directed to an autonomous vehicle. The autonomous vehicle can include a display device and a computing system. The display device can be affixed to an exterior of the autonomous vehicle and configured to display information associated with a plurality of different systems such that the information is visible to an observer located outside of the autonomous vehicle and standing on a surface on which the autonomous vehicle is located irrespective of a position of the observer around the autonomous vehicle. The computing system can be configured to perform operations. The operations can include determining one or more maintenance statuses of one or more of the plurality of different systems of the autonomous vehicle. The operations can include causing the display device to depict at least one of the one or more maintenance statuses.

A further example aspect of the present disclosure is directed to a display device for an autonomous vehicle. The display device can be configured to affix to an exterior of the autonomous vehicle. The display device can be configured to display maintenance information associated with a plurality of different systems such that the maintenance information is visible to an observer located outside of the autonomous vehicle and standing on a surface on which the autonomous vehicle is located irrespective of a position of the observer around the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
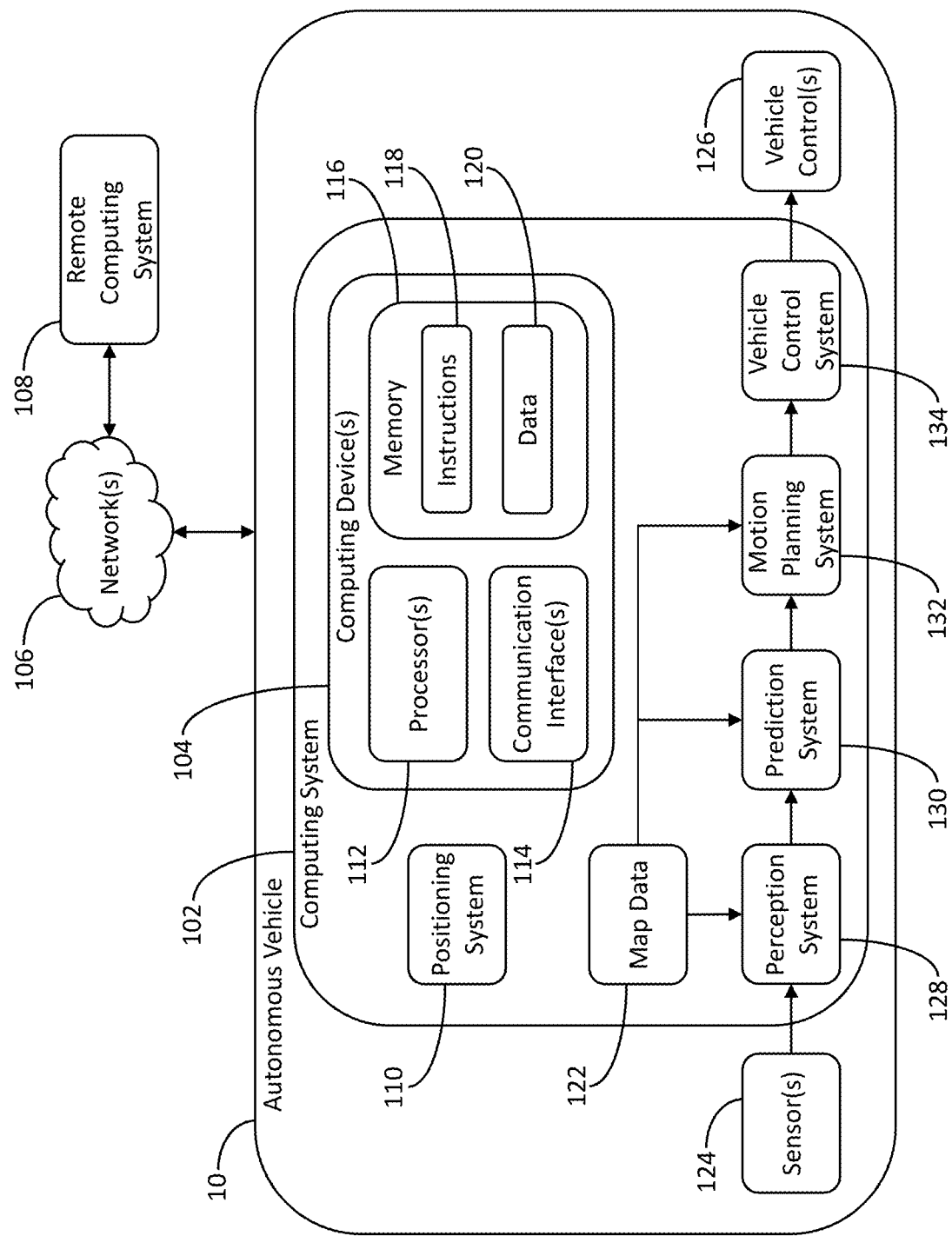
FIG. 1 depicts an example autonomous vehicle according to example embodiments of the present disclosure.

Example aspects of the present disclosure are directed to communicating autonomous-vehicle status. In particular, a display device can be affixed (or configured to affix) to an exterior of an autonomous vehicle (e.g., to the front of an autonomous vehicle, the roof of an autonomous vehicle, and/or the like). The display device can display (or be configured to display) information (e.g., data, graphics, representations, and/or the like) associated with multiple different systems (e.g., mechanical systems, electrical systems, sensor systems, and/or the like) of the autonomous vehicle such that the information is visible to an observer located outside the vehicle (e.g., a technician servicing the vehicle, and/or the like). A computing system including one or more computing devices can be associated with the display device and/or the autonomous vehicle (e.g., onboard the vehicle, and/or the like). The computing system can determine (e.g., based at least in part on data received from the system(s), and/or the like) one or more maintenance statuses of the system(s) and can depict the maintenance status(es) via the display device (e.g., for viewing by the observer, and/or the like).

In some embodiments, determining the maintenance status(es) can include determining a vehicle operational status (e.g., whether the vehicle is ready to operate, and/or the like), a vehicle health status (e.g., an indication or metric of the vehicle's condition, and/or the like), an energy level (e.g., a voltage, shore-power level, battery charge level, and/or the like), a fuel level (e.g., an amount of fuel onboard the vehicle, and/or the like), an available range (e.g., a distance or amount of time the vehicle can operate without maintenance, refueling, recharging, and/or the like), an available operating time (e.g., a time at which the vehicle will be ready to operate, an amount of time until the vehicle will be ready to operate, an amount of time the vehicle can operate without maintenance, refueling, recharging, and/or the like), a tire pressure (e.g., of a tire mounted to a wheel of the vehicle, and/or the like), a status of a software update (e.g., an amount or percentage of an update downloaded or uploaded, an amount of time remaining to complete an upload or download, and/or the like), a status of a data update (e.g., an amount or percentage of an update downloaded or uploaded, an amount of time remaining to complete an upload or download, and/or the like), an error code (e.g., identifying an issue with a vehicle component, system, and/or the like), an identifier associated with a system fault (e.g., identifying a system failure, and/or the like), an identifier of the autonomous vehicle (e.g., an owner of the vehicle, a vehicle identifier assigned by a manufacturer or operator of the vehicle, and/or the like), an identifier of an individual associated with the autonomous vehicle (e.g., a technician servicing the vehicle, and/or the like), an identifier associated with a known problem (e.g., identifying a problem known to occur with vehicles of the vehicle type, and/or the like), an identifier associated with a known solution (e.g., identifying a solution to a problem known to occur with vehicles of the vehicle type, and/or the like), a status of an access-control system (e.g., whether a door or hatch is locked, ajar, and/or the like), whether the autonomous vehicle is physically connected to an external system (e.g., a power source, a diagnostic system, and/or the like), and/or an operational role of the autonomous vehicle within a fleet of autonomous vehicles (e.g., whether the vehicle is assigned to service customers, test software or hardware, gather data about a geographic location, and/or the like).

In some embodiments, determining the maintenance status(es) can include determining the statuses of multiple different and/or distinct systems of the vehicle. For example, the status of a first system and the status of a second system can be determined. In some of such embodiments, depicting the maintenance status(es) can include rotating between depicting the status of the first system and depicting the status of the second system (e.g., at periodic intervals, in response to one or more changes in the status(es), and/or the like). Additionally or alternatively, depicting the maintenance status(es) can include simultaneously depicting the status of the first system and the status of the second system. For example, the status of the first system can be depicted via text, a graphic, a color, and/or the like, and the status of the second system can be depicted via a different graphic, color, and/or the like (e.g., displayed alongside of, overlaid on, in the background of, and/or the like the depiction of the status of the first system, and/or the like).

In some embodiments, an aggregate status of the systems can be determined (e.g., based at least in part on the status of the first system, the status of the second system, and/or the like) and depicted. For example, the aggregate status can indicate whether both systems indicate the vehicle is operational, requires maintenance, and/or the like. Additionally or alternatively, the aggregate status can indicate an amount of available operational time, an amount of further required maintenance time, a percentage of resources remaining, a percentage of maintenance operations completed, and/or the like.

In some embodiments, the status of the first system can be depicted via the display device. User input requesting the status of the second system can be received from a device distinct from the autonomous vehicle (e.g., a device being utilized by a technician servicing the vehicle, and/or the like). In response to receiving the user input, the status of the second system can be depicted via the display device (e.g., in lieu of the status of the first system, in addition to the status of the first system, and/or the like).

Additionally or alternatively, a hierarchy of statuses (e.g., based at least in part on their perceived relative importance, relevance, criticality, and/or the like) can indicate that the status of the first system should be depicted in lieu of the status of the second system. The hierarchy can be stored in a data structure in an accessible memory onboard the autonomous vehicle (e.g., via a wired network) and/or in accessible memory that is remote from the autonomous vehicle (e.g., via a wireless network). Such a hierarchy can be accessed to determine which status is to be depicted via the display device. For example, the status of the first system can be depicted in response to a determination that the hierarchy indicates the status of the first system should be depicted in lieu of the status of the second system.

In some embodiments, determining the maintenance status(es) can include determining an amount of time remaining (e.g., until a maintenance operation is completed, and/or the like), a level of a metric (e.g., an amount of data uploaded or downloaded, and/or the like), a percentage of a metric (e.g., a percentage of a total amount of data to be upload or downloaded that has been uploaded or downloaded, and/or the like). Accordingly, depicting the maintenance status(es) can include graphically depicting the amount of time remaining, the level of the metric, the percentage of the metric, and/or the like.

In some embodiments, the autonomous vehicle can be part of a fleet of autonomous vehicles that includes one or more other autonomous vehicles positioned alongside the autonomous vehicle (e.g., in a garage, and/or the like). In some of such embodiments, determining the maintenance status(es) can include determining a status of the autonomous vehicle in relation to the other vehicle(s), and depicting the maintenance status(es) can include depicting the status of the autonomous vehicle in relation to the other vehicle(s) such that the status of the autonomous vehicle is distinguishable from one or more statuses depicted by the other vehicle(s). For example, the autonomous vehicle can be part of a queue including the other vehicle(s). The computing system can determine a status that is indicative of a position of the autonomous vehicle in the queue, and the position of the autonomous vehicle in the queue can be depicted via the display device.

In some embodiments, the display device can be configured to display the information to an observer located outside of the autonomous vehicle (e.g., a technician servicing the vehicle, and/or the like) and standing on a surface on which the vehicle is located (e.g., a garage floor, and/or the like) irrespective of a position of the observer around the vehicle (e.g., which side of the vehicle (left, right, front, or rear) the observer is standing, and/or the like). In some of such embodiments, determining the maintenance status(es) can include determining a location on the autonomous vehicle associated with a status, and depicting the maintenance status(es) can include depicting the status in the direction of the location. For example, a tire pressure for the front-left tire can be determined, and the tire pressure can be depicted in the direction of the front-left tire.

In some embodiments, the display device can include a rotatable portion, and depicting the maintenance status(es) can include depicting the maintenance status(es) via the rotatable portion. For example, the display device can include a rotatable portion of a light detection and ranging (LIDAR) device, and depicting the maintenance status(es) can include depicting the maintenance status(es) via the rotatable portion of the LIDAR device. In some embodiments, depicting the maintenance status(es) can include illuminating, based at least in part on a rotational frequency of the LIDAR device, one or more light-emitting elements (e.g., light-emitting diodes, and/or the like) affixed to the rotatable portion of the LIDAR device to display imagery depicting the maintenance status(es).

The methods, devices, and systems described herein can provide a number of technical effects and benefits. For example, the methods, devices, and systems described herein can allow an observer (e.g., a service technician, and/or the like) located outside one or more autonomous vehicles (e.g., located in a garage, and/or the like) to readily determine their maintenance status(es) and more efficiently allocate resources (e.g., time, service technicians, maintenance systems or supplies, and/or the like) amongst the vehicle(s). Additionally or alternatively, the methods, devices, and systems described herein can allow the observer to readily diagnose one or more issues or problems associated with one or more systems of the vehicle(s).

With reference now to the Figures, example embodiments of the present disclosure will be discussed in further detail.

FIG. 1 depicts an example autonomous vehicle according to example embodiments of the present disclosure. Referring to FIG. 1, autonomous vehicle 10 can be capable of sensing its environment, navigating its environment with minimal or no human input, and/or the like. Autonomous vehicle 10 can be a ground-based autonomous vehicle (e.g., car, truck, bus, and/or the like), an air-based autonomous vehicle (e.g., airplane, drone, helicopter, and/or the like), and/or other type of vehicle (e.g., watercraft, and/or the like). Autonomous vehicle 10 can include one or more sensors 124, computing system 102, and one or more vehicle controls 126. Computing system 102 can assist in controlling autonomous vehicle 10. For example, computing system 102 can receive data generated by sensor(s) 124, attempt to comprehend an environment surrounding autonomous vehicle 10 by performing various processing techniques on the data generated by sensor(s) 124, generate, determine, select, and/or the like a motion plan for navigating autonomous vehicle 10 through, within, and/or the like such surrounding environment, and/or the like. Computing system 102 can interface with vehicle control(s) 126 to operate autonomous vehicle 10 (e.g., in accordance with the motion plan, and/or the like).

Computing system 102 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable autonomous vehicle 10 (e.g., computing system 102, computing device(s) 104, and/or the like) to communicate with one or more computing systems, computing devices, and/or the like distinct from autonomous vehicle 10 (e.g., computing system 108, and/or the like). Memory 116 can include (e.g., store, and/or the like) instructions 118 and data 120. When executed by processor(s) 112, instructions 118 can cause autonomous vehicle 10 (e.g., computing system 102, computing device(s) 104, and/or the like) to perform one or more operations, functions, and/or the like described herein. Data 120 can include, represent, and/or the like information associated with such operations, functions, and/or the like, data generated by sensor(s) 124, and/or the like.

Computing system 102 can be physically located onboard autonomous vehicle 10, and computing system 108 can be distinct and/or remotely located from autonomous vehicle 10. One or more networks 106 (e.g., wired networks, wireless networks, and/or the like) can interface autonomous vehicle 10 (e.g., computing system 102, computing device(s) 104, and/or the like) with computing system 108, which can include one or more computing devices analogous to computing device(s) 104, one or more components (e.g., memory, processors, communication interfaces, and/or the like) analogous to those of computing device(s) 104, and/or the like. Unless explicitly indicated otherwise, the operations, functions, and/or the like described herein can be performed by computing system(s) 102 and/or 108 (e.g., by computing system 102, by computing system 108, by a combination of computing systems 102 and 108, and/or the like).

Computing system 102 can include positioning system 110, which can include one or more devices, circuitry, and/or the like for analyzing, approximating, determining, and/or the like one or more geographic positions of autonomous vehicle 10. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 102 can include perception system 128, prediction system 130, and motion planning system 132, which can cooperate to perceive a dynamic environment surrounding autonomous vehicle 10, generate, determine, select, and/or the like a motion plan for autonomous vehicle 10, and/or the like.

Perception system 128 can receive data from sensor(s) 124, which can be coupled to or otherwise included within autonomous vehicle 10. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding autonomous vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wave-length, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding autonomous vehicle 10. For example, map data 122 can provide information regarding: the identity and location of different travelways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic control data (e.g., the location and/or instructions of signage, traffic lights, other traffic control devices, and/or the like); other map data providing information that can assist computing system 102 in comprehending, perceiving, and/or the like an environment surrounding autonomous vehicle 10, its relationship thereto, and/or the like.

Perception system 128 can (e.g., based at least in part on data received from sensor(s) 124, map data 122, and/or the like) identify one or more objects proximate to autonomous vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, bicycle, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion planning system 132 can generate, determine, select, and/or the like a motion plan for autonomous vehicle 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion planning system 132 can generate, determine, select, and/or the like a motion plan for autonomous vehicle 10 that it determines (e.g., based at least in part on one or more operation parameters, and/or the like) best navigates autonomous vehicle 10 relative to the object(s). Motion planning system 132 can provide the motion plan to vehicle control system 134, which can directly and/or indirectly control autonomous vehicle 10 via vehicle control(s) 126 (e.g., one or more actuators, devices, and/or the like that control gas, power flow, steering, braking, and/or the like) in accordance with the motion plan.

Perception system 128, prediction system 130, motion planning system 132, and/or vehicle control system 134 can include logic utilized to provide functionality described herein. Perception system 128, prediction system 130, motion planning system 132, and/or vehicle control system 134 can be implemented in hardware (e.g., circuitry, and/or the like), firmware, software configured to control one or more processors, one or more combinations thereof, and/or the like. For example, instructions 118, when executed by processor(s) 112, can cause autonomous vehicle 10 (e.g., computing system 102, computing device(s) 104, and/or the like) to implement functionality of perception system 128, prediction system 130, motion planning system 132, and/or vehicle control system 134 described herein.

Figure 2:
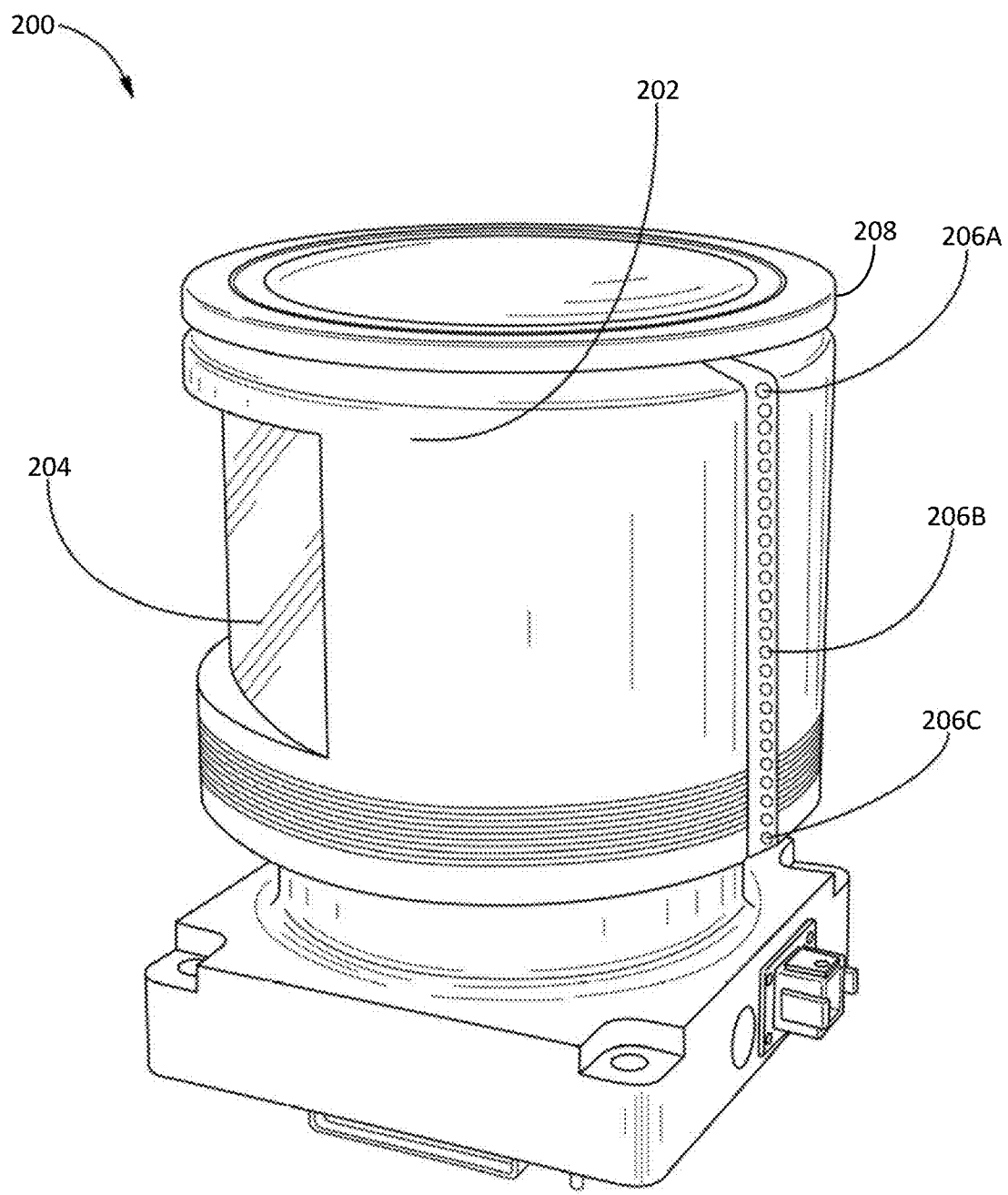
FIG. 2 depicts an example LIDAR device according to example embodiments of the present disclosure.

FIG. 2 depicts an example LIDAR device according to example embodiments of the present disclosure. Referring to FIG. 2, LIDAR device 200 can be affixed, configured to affix, and/or the like to autonomous vehicle 10 (e.g., to the front of the vehicle, the roof of the vehicle, and/or the like). Device 200 can include a scanning device (not illustrated), for example, contained within housing 202. One or more lenses 204 can be positioned in front of one or more emitter/detectors (not illustrated) of such scanning device in order to focus outgoing laser light, returned light, and/or the like. Housing 202 can be positioned, configured, and/or the like such that it can be driven by a motor (not illustrated) to rotate about a vertical axis that is perpendicular to the emitter/detector(s). Accordingly, when device 200 rotates, the emitter/detector(s) can each pass across a target along a horizontal plane. One or more light-emitting elements 206 (e.g., light-emitting diodes (LEDs), and/or the like) can be positioned on, coupled to, affixed to, and/or the like housing 202. Element(s) 206 can be joined to one or more support elements (not illustrated), joined directly to housing 202, and/or the like. In some embodiments, element(s) 206 can be located on or near an exterior surface of device 200. Additionally or alternatively, element(s) 206 can be located within an interior portion of device 200 and project outwards towards an exterior surface of device 200.

Element(s) 206 can display information associated with autonomous vehicle 10 (e.g., one or more maintenance statuses, other information described herein, and/or the like) such that the information is visible to an observer located outside the vehicle (e.g., a technician servicing the vehicle, an individual waiting to board, load, unload, and/or the like the vehicle, and/or the like). In some embodiments, element(s) 206 can be illuminated, for example, based at least in part on a rotational frequency of device 200 (e.g., a rotational frequency of the emitter/detector(s), housing 202, and/or the like) to display imagery depicting such information. Rotation of element(s) 206 around a common axis can enable the impression of imagery being displayed on a surface through persistence of vision, which refers to the optical illusion that occurs when visual perception of an object does not cease for some time after rays of light proceeding from it have ceased to enter the eye. In this manner, imagery can be displayed by element(s) 206 on one or more rotatable surfaces (e.g., housing 202, and/or the like) of device 200. Such imagery can be displayed at a fixed location on device 200, move at fixed and/or random intervals across one or more different locations on device 200, scroll across a region and/or the entire circumference of device 200, and/or the like. In this manner, a single image and/or different imagery can be displayed on device 200.

Device 200 can include portion 208, which can be fixed and/or rotatable. Portion 208 can include one or more light-emitting elements (e.g., LEDs, and/or the like), which can display information associated with autonomous vehicle 10 (e.g., one or more maintenance statuses, other information described herein, and/or the like) such that the information is visible to an observer located outside the vehicle.

Figure 3:
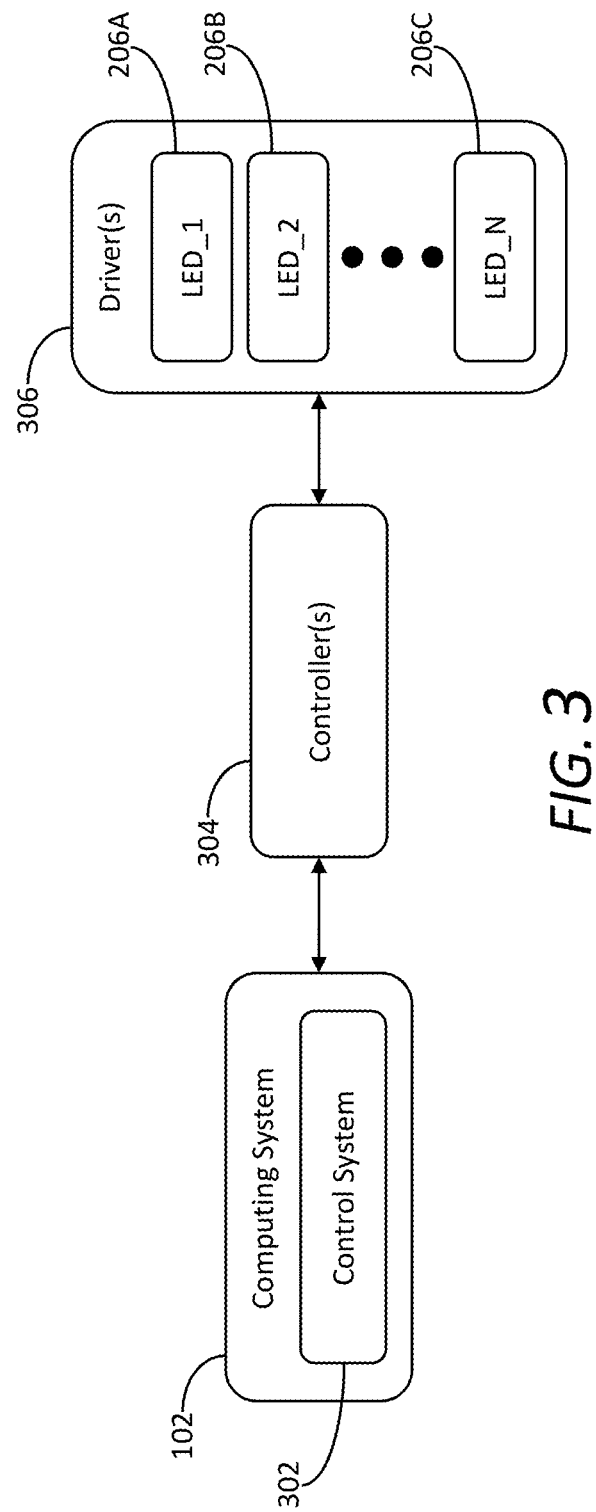
FIG. 3 depicts an example control system for a LIDAR device according to example embodiments of the present disclosure.

FIG. 3 depicts an example control system for a LIDAR device according to example embodiments of the present disclosure. Referring to FIG. 3, control system 302 can be configured to send signals to one or more controllers 304, which can cause one or more of element(s) 206 to illuminate, for example, based at least in part on a rotational frequency of device 200. For example, controller(s) 304 can send one or more signals, to one or more drivers 306 respectively associated with one or more of element(s) 206, to illuminate such element(s). Control system 302 can be configured to receive, monitor, and/or the like data provided by controller(s) 304, driver(s) 306, and/or element(s) 206 (e.g., indicating element not properly illuminating, driver not properly functioning, and/or the like) and adjust accordingly.

Element(s) 206 can be capable of different colors, light outside the visible light spectrum, and/or the like. In some embodiments, element(s) 206 can project imagery on a surface (e.g., roadway, sidewalk, tunnel wall, and/or the like) away from device 200. Brightness of element(s) 206 can be controlled by control system 302, for example, by using a control signal (e.g., a pulse-width modulation signal, and/or the like) controlling one or more voltages to element(s) 206. For example, brightness of element(s) 206 can be adjusted based at least in part on ambient conditions (e.g., time of day, weather, and/or the like), maximum brightness allowed in an area based at least in part on laws or ordinances, the type of imagery being presented, and/or the like. Additionally or alternatively, control system 302 can prevent element(s) 206 from appearing to flash when illuminated to display imagery, for example, when autonomous vehicle 10 is located in an area with laws or ordinances directed to flashing lights, and/or the like. For example, if device 200 is rotating at a speed which results in a strobe effect by one or more of element(s) 206, one or more additional elements of element(s) 206 can be illuminated (e.g., to prevent or mitigate the strobe effect, and/or the like).

Control system 302 can generate imagery by controlling illumination of element(s) 206. In some embodiments, one or more of element(s) 206 can illuminate in two or more different colors, and control system 302 can control illumination for each color associated with element(s) 206. For example, one or more of element(s) 206 can be illuminated to produce a particular color, while one or more different elements of element(s) 206 are illuminated to produce a different color. Driver(s) 306 can be in communication with controller(s) 304 to control illumination of element(s) 206. Controller(s) 304 can be configured in a master/slave arrangement. One or more of driver(s) 306 can be utilized in association with a predetermined number of element(s) 206. Element(s) 206 can be rotated around a common axis of device 200. One or more full rotations can be separated into a predetermined number of individual illumination cycles, whereby each of element(s) 206 is able to illuminate (e.g., in one or more different colors, and/or the like) to allow imagery to be generated on one or more surfaces of device 200. After an illumination cycle takes place, driver(s) 306 can be loaded with new data to generate additional imagery in a subsequent cycle. Based at least in part on the type of imagery to be displayed, data can be determined, stored, and/or the like prior to being transmitted to controller(s) 304, driver(s) 306, and/or the like.

In some embodiments, a rotational frequency of device 200 can be determined by control system 302 and can be utilized to determine when and/or which of element(s) 206 to illuminate during rotation of device 200 to result in display of desired imagery. For example, a data-acquisition system can provide real-time rotational-frequency information for device 200, and such information can be used to control illumination of element(s) 206. In some embodiments, predetermined, preset, and/or the like rotational-frequency information for device 200 can be utilized to control illumination of element(s) 206. For example, device 200 can be configured to rotate at approximately 550-650 rotations per minute. Additionally or alternatively, one or more active determinations (e.g., based at least in part on measuring the real-time rotation of device 200, and/or the like) can be utilized to control illumination of element(s) 206. Control system 302 can control illumination of element(s) 206 based at least in part on a range of rotational frequency, the desired imagery, and/or the like, for example, by taking an average of the rotational frequency, adjusting illumination of element(s) 206 based at least in part on the range of frequency, and/or the like.

Figure 4:
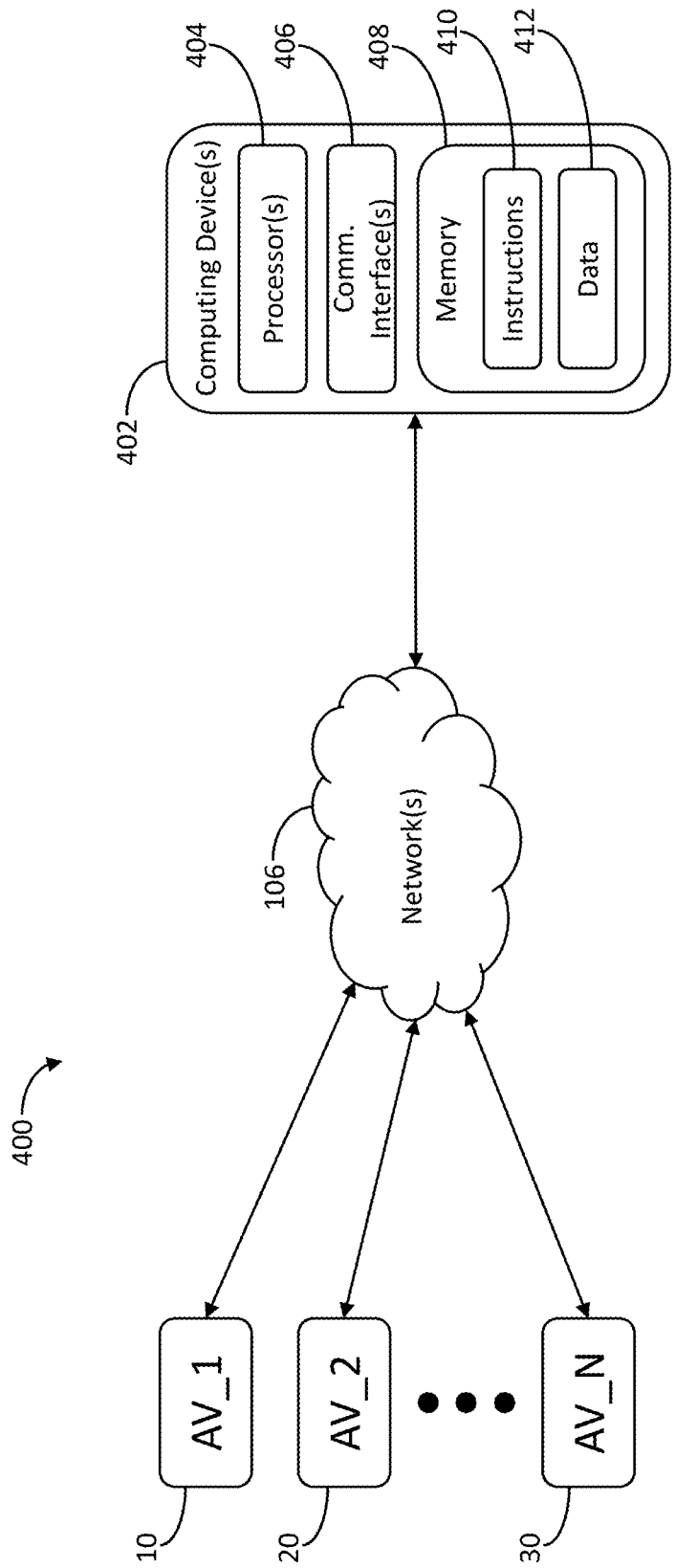
FIG. 4 depicts an example operating environment according to example embodiments of the present disclosure.

FIG. 4 depicts an example operating environment according to example embodiments of the present disclosure. Referring to FIG. 4, environment 400 can include autonomous vehicles 10, 20, and/or 30. It will be appreciated that autonomous vehicles 20 and/or 30 can include one or more components described above with respect to autonomous vehicle 10. Environment 400 can include network(s) 106, which can interface autonomous vehicle(s) 10, 20, and/or 30 with one another, computing system 108, and/or one or more computing devices 402. Computing device(s) 402 (e.g., one or more smartphones, mobile devices, tablet computers, laptop computers, desktop computers, and/or the like) can be utilized by one or more individuals proximate (e.g., close enough to view displayed information described herein, and/or the like) to autonomous vehicles 10, 20, and/or 30 (e.g., one or more technicians servicing autonomous vehicles 10, 20, and/or 30, individuals waiting to board, load, unload, and/or the like autonomous vehicles 10, 20, and/or 30, and/or the like). Computing device(s) 402 can include one or more processor(s) 404, one or more communication interfaces 406, and memory 408 (e.g., one or more hardware components for storing executable instructions, data, and/or the like). Communication interface(s) 406 can enable computing device(s) 402 to communicate with one another, autonomous vehicles 10, 20, and/or 30, computing system 108, and/or the like. Memory 408 can include (e.g., store, and/or the like) instructions 410 and data 412. When executed by processor(s) 404, instructions 410 can cause computing device(s) 402 to perform one or more operations, functions, and/or the like described herein. Data 412 can include, represent, and/or the like information associated with such operations, functions, and/or the like. Unless explicitly indicated otherwise, the operations, functions, and/or the like described herein can be performed by one or more computing systems of autonomous vehicles 10, 20, and/or 30 (e.g., computing system 102, and/or the like), computing system 108, and/or computing device(s) 402 (e.g., by computing system 102, by a computing system of autonomous vehicle 20, by a computing system of autonomous vehicle 30, by computing system 108, by one or more of computing device(s) 402, by a combination of one or more of computing system 102, a computing system of autonomous vehicle 20, a computing system of autonomous vehicle 30, computing system 108, one or more of computing device(s) 402, and/or the like).

Figure 5A:
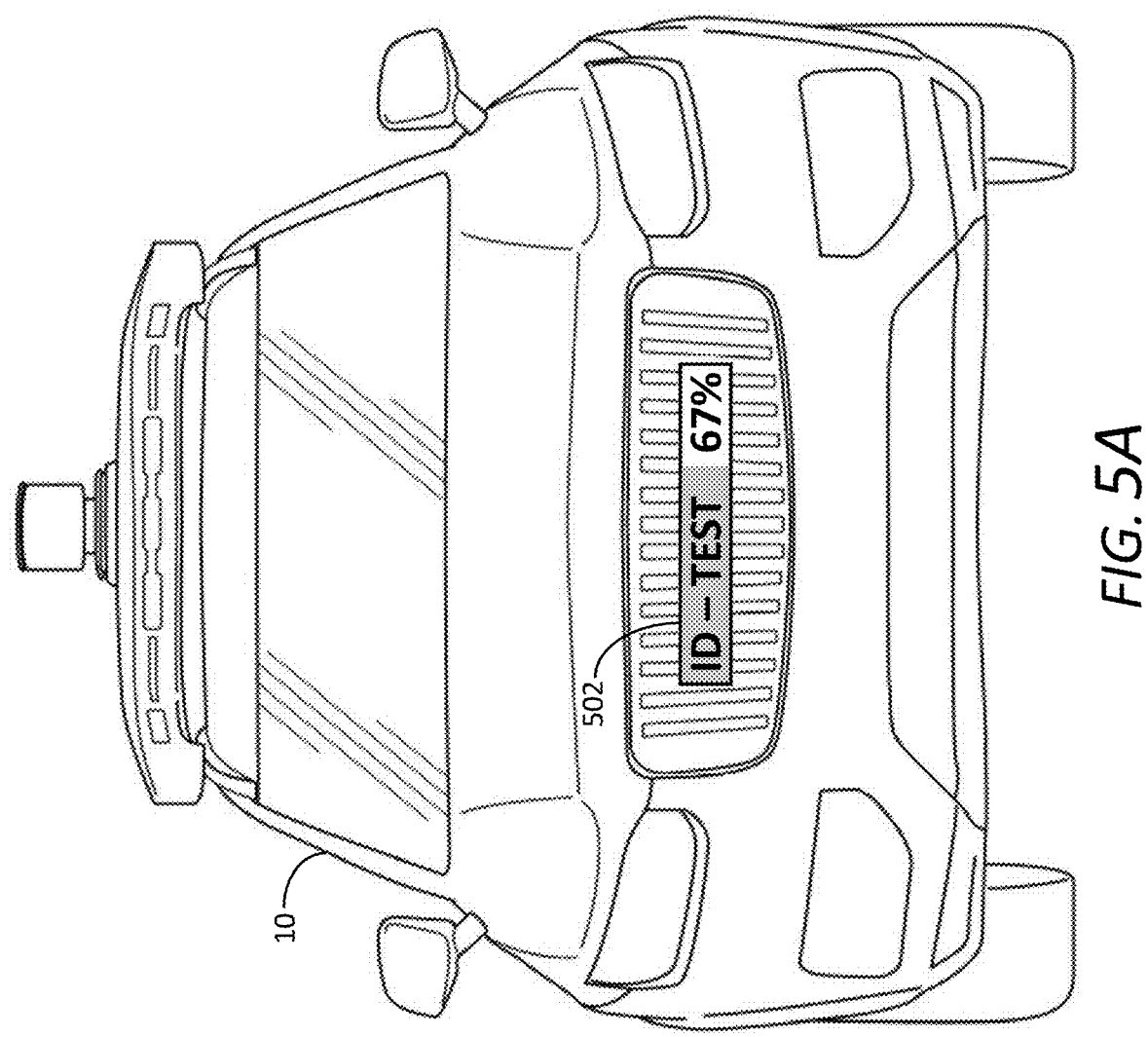
FIGS. 5A and 5B depict example views of autonomous vehicles according to example embodiments of the present disclosure.
Figure 5B:
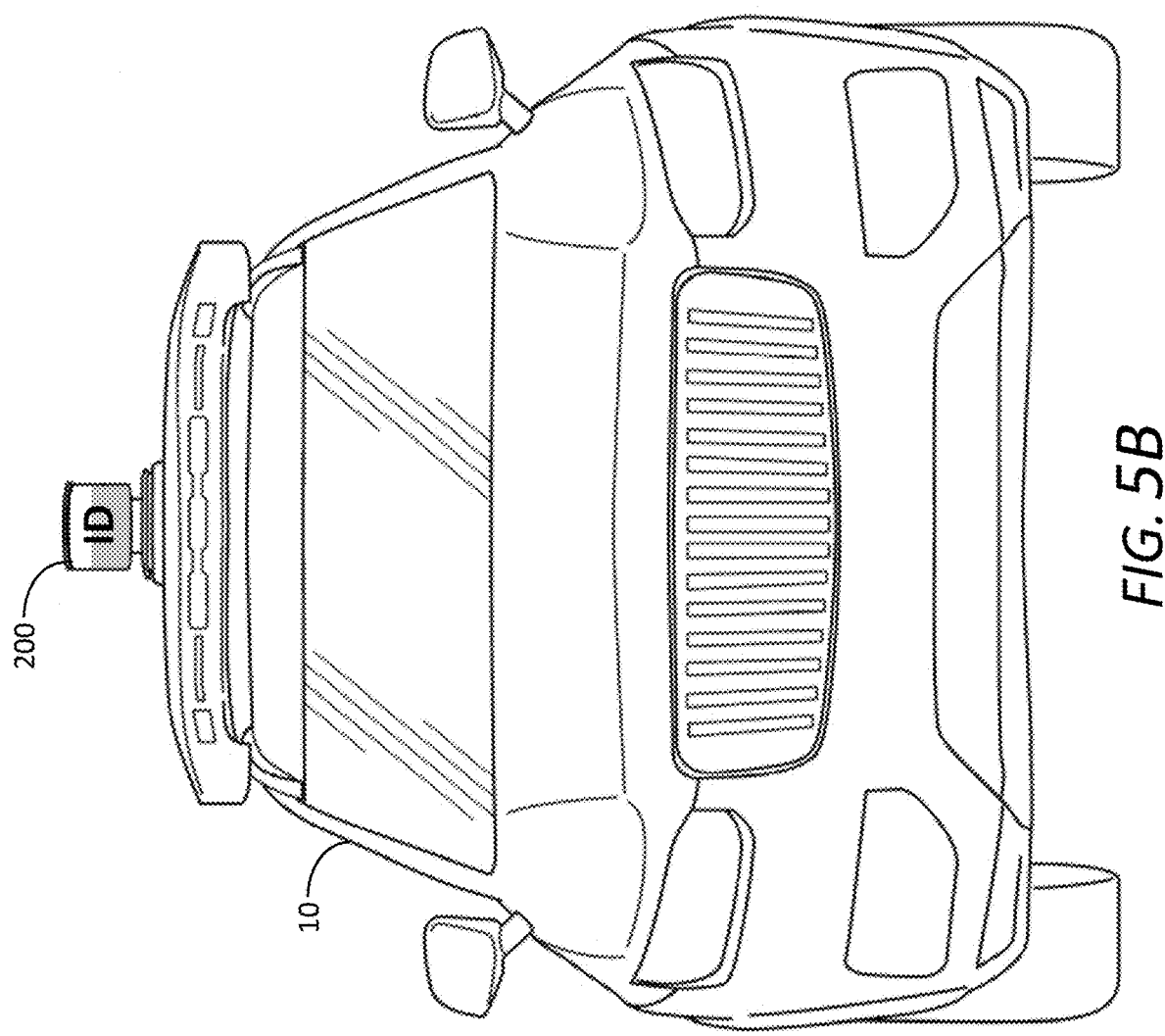

FIGS. 5A and 5B depict example views of autonomous vehicles according to example embodiments of the present disclosure. Referring to FIG. 5A, autonomous vehicle 10 can include a display device affixed (or configured to affix) to an exterior of autonomous vehicle 10 (e.g., to the front of autonomous vehicle 10, the roof of autonomous vehicle 10, and/or the like). For example, autonomous vehicle 10 can include device 502. Device 502 can display (or be configured to display) information (e.g., data, imagery, graphics, representations, and/or the like) associated with multiple different systems (e.g., mechanical systems, electrical systems, sensor systems, and/or the like) of autonomous vehicle 10, other information described herein, and/or the like such that the information is visible to one or more observers located outside autonomous vehicle 10 (e.g., one or more technicians servicing autonomous vehicle 10, individuals waiting to board, load, unload, and/or the like autonomous vehicle 10, and/or the like). In accordance with aspects of the disclosure, a computing system (e.g., computing system(s) 102 and/or 108, a computing system including one or more of computing device(s) 402, and/or the like) can determine, generate, select, and/or the like (e.g., based at least in part on data received from the system(s) of autonomous vehicle 10, and/or the like) one or more maintenance statuses of the system(s), other information described herein, and/or the like and can depict, cause to be depicted, and/or the like such maintenance status(es), other information, and/or the like via device 502 (e.g., for viewing by the observer(s), and/or the like).

In some embodiments, determining the maintenance status(es) can include determining an operational status of autonomous vehicle 10 (e.g., whether autonomous vehicle 10 is ready to operate, and/or the like), a health status of autonomous vehicle 10 (e.g., an indication or metric of a condition of autonomous vehicle 10, and/or the like), an energy level (e.g., a voltage, shore-power level, battery charge level, and/or the like associated with autonomous vehicle 10), a fuel level (e.g., an amount of fuel onboard autonomous vehicle 10, and/or the like), an available range of autonomous vehicle 10 (e.g., a distance or amount of time autonomous vehicle 10 can operate without maintenance, refueling, recharging, and/or the like), an available operating time of autonomous vehicle 10 (e.g., a time at which autonomous vehicle 10 will be ready to operate, an amount of time until autonomous vehicle 10 will be ready to operate, an amount of time autonomous vehicle 10 can operate without maintenance, refueling, recharging, and/or the like), a tire pressure (e.g., of a tire mounted to a wheel of autonomous vehicle 10, and/or the like), a status of a software update associated with autonomous vehicle 10 (e.g., an amount or percentage of an update downloaded or uploaded, an amount of time remaining to complete an upload or download, and/or the like), a status of a data update associated with autonomous vehicle 10 (e.g., an amount or percentage of an update downloaded or uploaded, an amount of time remaining to complete an upload or download, and/or the like), an error code (e.g., identifying an issue with a vehicle component, system, and/or the like of autonomous vehicle 10), an identifier associated with a system fault of autonomous vehicle 10 (e.g., identifying a system failure, and/or the like), an identifier of autonomous vehicle 10 (e.g., an owner of autonomous vehicle 10, a vehicle identifier assigned by a manufacturer or operator of autonomous vehicle 10, and/or the like), an identifier of an individual associated with autonomous vehicle 10 (e.g., a technician servicing the vehicle, and/or the like), an identifier associated with a known problem of autonomous vehicle 10 (e.g., identifying a problem known to occur with vehicles of the vehicle type, and/or the like), an identifier associated with a known solution to a problem of autonomous vehicle 10 (e.g., identifying a solution to a problem known to occur with vehicles of the vehicle type, and/or the like), a status of an access-control system of autonomous vehicle 10 (e.g., whether a door or hatch is locked, ajar, and/or the like), whether autonomous vehicle 10 is physically connected to an external system (e.g., a power source, a diagnostic system, and/or the like), and/or an operational role of autonomous vehicle 10 within a fleet of autonomous vehicles (e.g., whether autonomous vehicle 10 is assigned to service customers, test software or hardware, gather data about a geographic location, and/or the like). The computing system can depict, cause to be depicted, and/or the like (e.g., via device 502, and/or the like) such maintenance status(es).

Additionally or alternatively, the computing system can determine, generate, depict, cause to be depicted, and/or the like (e.g., via device 502, and/or the like) other information associated with autonomous vehicle 10. Such information can include data, information, graphics, imagery, and/or the like: including one or more advertisements or items of news (e.g., advertisements or news items selected based at least in part on an identifier, passenger, geographic location, and/or the like of autonomous vehicle 10); communicated to computing device(s) 402 and/or captured, generated, selected, and/or the like by computing device(s) 402 (e.g., by a camera, via user input, and/or the like), for example, for utilization by one or more observers located outside autonomous vehicle 10 (e.g., one or more technicians servicing autonomous vehicle 10, individuals waiting to board, load, unload, and/or the like autonomous vehicle 10, and/or the like) in identifying autonomous vehicle 10, distinguishing autonomous vehicle 10 from one or more other (e.g., proximate, and/or the like) autonomous vehicles, and/or the like; signaling one or more individuals proximate to autonomous vehicle 10 of an intention of autonomous vehicle 10 with regards to its current environment (e.g., an intention to stop, pass, turn, wait for a vehicle, pedestrian, traffic director, and/or the like); identifying, indicating, and/or the like a position of autonomous vehicle 10 (e.g., of a door, and/or the like) that should be utilized by one or more individuals proximate to autonomous vehicle 10 (e.g., to board, disembark, load or unload cargo, and/or the like), for example, based at least in part on an occupancy status of autonomous vehicle 10, a geographic location of autonomous vehicle 10, traffic conditions of an environment in which autonomous vehicle 10 is located, and/or the like; providing information (e.g., as part of an authentication process, and/or the like) for input (e.g., via computing device(s) 402, and/or the like) by one or more observers located outside autonomous vehicle 10; and/or the like.

In some embodiments, determining the maintenance status(es) can include determining the statuses of multiple different and/or distinct systems of autonomous vehicle 10. For example, the status of a first system and the status of a second system can be determined. In some of such embodiments, depicting the maintenance status(es) can include rotating between depicting the status of the first system and depicting the status of the second system (e.g., at periodic intervals, in response to one or more changes in the status(es), and/or the like). Additionally or alternatively, depicting the maintenance status(es) can include simultaneously depicting the status of the first system and the status of the second system. For example, the status of the first system can be depicted via text (e.g., the "ID," "TEST," "67%," and/or the like text depicted by device 502), a graphic (e.g., the portion of the background shaded, filled, and/or the like depicted by device 502), a color (e.g., a color of one or more portions of the text, background shading, fill, and/or the like depicted by device 502), and/or the like, and the status of the second system can be depicted via a different graphic, color, and/or the like (e.g., displayed alongside of, overlaid on, in the background of, and/or the like the depiction of the status of the first system, and/or the like).

In some embodiments, an aggregate status of the systems can be determined (e.g., based at least in part on the status of the first system, the status of the second system, and/or the like) and depicted (e.g., via device 502, and/or the like). For example, the aggregate status can indicate (e.g., via a color of one or more portions of the text, background shading, fill, and/or the like depicted by device 502, and/or the like) whether both systems indicate the vehicle is operational, requires maintenance, and/or the like. Additionally or alternatively, the aggregate status can indicate (e.g., via the portion of the background shaded, filled, and/or the like depicted by device 502, and/or the like) an amount of available operational time, an amount of further required maintenance time, a percentage of resources remaining, a percentage of maintenance operations completed, and/or the like.

In some embodiments, the status of the first system can be depicted via the display device (e.g., device 502, and/or the like). User input requesting the status of the second system can be received from a device distinct from the autonomous vehicle, for example, a device (e.g., one or more of computing device(s) 402, and/or the like) being utilized by a technician servicing the vehicle, and/or the like. In response to receiving the user input, the status of the second system can be depicted via the display device (e.g., in lieu of the status of the first system, in addition to the status of the first system, and/or the like). Additionally or alternatively, a hierarchy of statuses (e.g., based at least in part on their perceived relative importance, relevance, criticality, and/or the like) can indicate that the status of the first system should be depicted in lieu of the status of the second system. For example, the status of the first system can be depicted in response to a determination that the hierarchy indicates the status of the first system should be depicted in lieu of the status of the second system.

In some embodiments, determining the maintenance status(es) can include determining an amount of time remaining (e.g., until a maintenance operation is completed, and/or the like), a level of a metric (e.g., an amount of data uploaded or downloaded, and/or the like), a percentage of a metric (e.g., a percentage of a total amount of data to be upload or downloaded that has been uploaded or downloaded, and/or the like). In some of such embodiments, depicting the maintenance status(es) can include graphically depicting (e.g., via the portion of the background shaded, filled, and/or the like depicted by device 502, and/or the like) the amount of time remaining, the level of the metric, the percentage of the metric, and/or the like.

In some embodiments, autonomous vehicle 10 can be part of a fleet of autonomous vehicles that includes one or more other autonomous vehicles (e.g., autonomous vehicles 20, 30, and/or the like) positioned alongside autonomous vehicle 10 (e.g., in a garage, and/or the like). In some of such embodiments, determining the maintenance status(es) can include determining a status of autonomous vehicle 10 in relation to the other vehicle(s), and depicting the maintenance status(es) can include depicting (e.g. via device 502, and/or the like) the status of autonomous vehicle 10 in relation to the other vehicle(s) such that the status of autonomous vehicle 10 is distinguishable from one or more statuses depicted by the other vehicle(s) (e.g., via one or more display devices similar to device 502, and/or the like). For example, autonomous vehicle 10 can be part of a queue including the other vehicle(s). The computing system can determine a status that is indicative of a position of autonomous vehicle 10 in the queue, and the position of autonomous vehicle 10 in the queue can be depicted via the display device (e.g., device 502, and/or the like).

Referring to FIG. 5B, as indicated above, autonomous vehicle 10 can include a display device affixed (or configured to affix) to an exterior of autonomous vehicle 10 (e.g., to the front of autonomous vehicle 10, the roof of autonomous vehicle 10, and/or the like). For example, autonomous vehicle 10 can include device 200. Device 200 can display (or be configured to display) information (e.g., data, imagery, graphics, representations, and/or the like) associated with multiple different systems (e.g., mechanical systems, electrical systems, sensor systems, and/or the like) of autonomous vehicle 10, other information described herein, and/or the like such that the information is visible to one or more observers located outside autonomous vehicle 10 (e.g., one or more technicians servicing autonomous vehicle 10, individuals waiting to board, load, unload, and/or the like autonomous vehicle 10, and/or the like). In accordance with aspects of the disclosure, a computing system (e.g., computing system(s) 102 and/or 108, a computing system including one or more of computing device(s) 402, and/or the like) can determine, generate, select, and/or the like (e.g., based at least in part on data received from the system(s) of autonomous vehicle 10, and/or the like) one or more maintenance statuses of the system(s), other information described herein, and/or the like and can depict, cause to be depicted, and/or the like such maintenance status(es), other information, and/or the like via device 200 (e.g., for viewing by the observer(s), and/or the like).

In some embodiments, the display device (e.g., device 200, and/or the like) can be configured to display the information to an observer located outside of autonomous vehicle 10 (e.g., a technician servicing autonomous vehicle 10, an individual waiting to board, load, unload, and/or the like autonomous vehicle 10, and/or the like) and standing on a surface on which autonomous vehicle 10 is located (e.g., a garage floor on which autonomous vehicle 10 is located, a road surface, sidewalk, and/or the like adjacent to a surface on which autonomous vehicle 10 is located, and/or the like) irrespective of a position of the observer around autonomous vehicle 10 (e.g., which side of the vehicle (left, right, front, or rear) the observer is standing, and/or the like). In some of such embodiments, determining the maintenance status(es) can include determining a location on autonomous vehicle 10 associated with a status, and depicting the maintenance status(es) can include depicting the status in the direction of the location. For example, a tire pressure for the front-left tire of autonomous vehicle 10 can be determined (e.g., to be low, and/or the like), and the tire pressure, the status (e.g., low, and/or the like) of the tire pressure, and/or the like can be depicted (e.g., via device 200) in the direction of the front-left tire. For example, device 200 can produce imagery, in the direction of the front-left tire, indicating (e.g., via text, graphics, color, and/or the like) the tire pressure, the status of the tire pressure, and/or the like. Additionally or alternatively, device 200 could rotate, illuminate, and/or the like one or more of element(s) 206, in the direction of the front-left tire, indicating (e.g., via color, and/or the like) the tire pressure, the status of the tire pressure, and/or the like; and/or portion 208 could rotate, illuminate, and/or the like one or more of its light-emitting elements, in the direction of the front-left tire, indicating (e.g., via color, and/or the like) the tire pressure, the status of the tire pressure, and/or the like.

Figure 6:
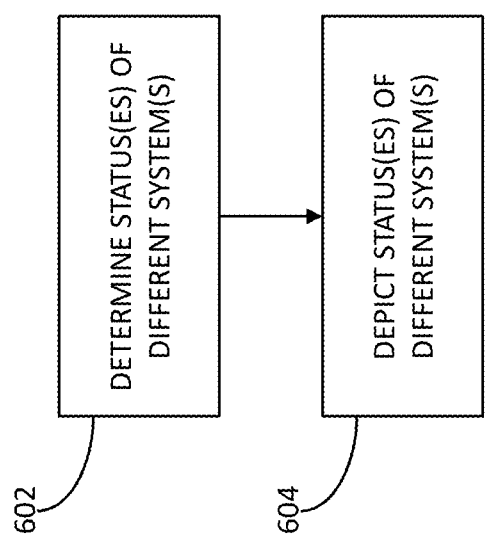
FIG. 6 depicts an example method according to example embodiments of the present disclosure.

FIG. 6 depicts an example method according to example embodiments of the present disclosure. Referring to FIG. 6, at (602), one or more maintenance statuses of one or more of multiple different systems of an autonomous vehicle can be determined. For example, computing system 102 can determine one or more maintenance statuses of one or more of multiple different systems of autonomous vehicle 10. At (604), at least one of the maintenance status(es) can be depicted via a display device affixed to an exterior of the autonomous vehicle and configured to display information associated with the multiple different systems such that the information is visible to an observer located outside the autonomous vehicle. For example, computing system 102 can depict, cause to be depicted, and/or the like one or more of the maintenance status(es) of the multiple different system(s) of autonomous vehicle 10 via devices 502, 200, and/or the like.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for communicating autonomous-vehicle status, the method comprising:
   determining, by a computing system comprising one or more computing devices, one or more maintenance statuses of one or more of a plurality of systems of an autonomous vehicle, wherein determining the one or more maintenance statuses comprises determining a status of the autonomous vehicle in relation to one or more other autonomous vehicles positioned alongside the autonomous vehicle; and
   depicting, through a display device affixed to an exterior of the autonomous vehicle and configured to display information associated with the plurality of systems such that the information is visible to an observer located outside the autonomous vehicle, at least one of the one or more maintenance statuses, wherein depicting the at least one of the one or more maintenance statuses comprises depicting the status of the autonomous vehicle in relation to the one or more other autonomous vehicles such that the status of the autonomous vehicle is distinguishable from one or more statuses depicted by the one or more other autonomous vehicles positioned alongside the autonomous vehicle.

2. The computer-implemented method of claim 1, wherein determining the one or more maintenance statuses comprises determining one or more of a vehicle operational status, a vehicle health status, an energy level, a fuel level, an available range, an available operating time, a tire pressure, a status of a software update, a status of a data update, an error code, an identifier associated with a system fault, an identifier of the autonomous vehicle, an identifier of an individual associated with the autonomous vehicle, an identifier associated with a known problem, an identifier associated with a known solution, a status of an access-control system, whether the autonomous vehicle is physically connected to an external system, or an operational role of the autonomous vehicle within a fleet of autonomous vehicles.

3. The computer-implemented method of claim 1, wherein:
   determining the one or more maintenance statuses comprises:
      determining a status of a first system of the plurality of systems, wherein the first system comprises a light detection and ranging system comprising one or more light detection and ranging sensors, and
      determining a status of a second system of the plurality of systems, wherein the second system comprises an access-control system associated with a door of the autonomous vehicle; and
   depicting the at least one of the one or more maintenance statuses comprises rotating between depicting the status of the first system and depicting the status of the second system.

4. The computer-implemented method of claim 1, wherein:
   determining the one or more maintenance statuses comprises:
      determining a status of a first system of the plurality of systems wherein the first system comprises a light detection and ranging system comprising one or more light detection and ranging sensors, and
      determining a status of a second system of the plurality of systems, wherein the second system comprises an access-control system associated with a door of the autonomous vehicle; and
   depicting the at least one of the one or more maintenance statuses comprises simultaneously depicting the status of the first system and the status of the second system.

5. The computer-implemented method of claim 4, wherein simultaneously depicting the status of the first system and the status of the second system comprises:
   depicting the status of the first system through one or more of text, a graphic, or a color; and
   depicting the status of the second system through one or more of a different graphic or a different color.

6. The computer-implemented method of claim 1, wherein:
   determining the one or more maintenance statuses comprises:
      determining a status of a first system of the plurality of systems,
      determining a status of a second system of the plurality of systems, and
      determining, based at least in part on the status of the first system and the status of the second system, an aggregate status for the autonomous vehicle; and
   depicting the at least one of the one or more maintenance statuses comprises depicting the aggregate status.

7. The computer-implemented method of claim 1, wherein:
   determining the one or more maintenance statuses comprises:
      determining a status of a first system of the plurality of systems, and
      determining a status of a second system of the plurality of systems; and
   depicting the at least one of the one or more maintenance statuses comprises:
      depicting the status of the first system, and
      responsive to receiving, from a computing device distinct from the autonomous vehicle, user input requesting the status of the second system, depicting the status of the second system.

8. The computer-implemented method of claim 1, wherein:
   determining the one or more maintenance statuses comprises:
      determining a status of a first system of the plurality of systems, and
      determining a status of a second system of the plurality of systems; and
   depicting the at least one of the one or more maintenance statuses comprises, responsive to a determination that a hierarchy indicates the status of the first system should be depicted in lieu of the status of the second system, depicting the status of the first system.

9. The computer-implemented method of claim 1, wherein:
   determining the one or more maintenance statuses comprises determining one or more of an amount of time, a level of a metric, or a percentage of a metric; and
   depicting the at least one of the one or more maintenance statuses comprises graphically depicting the one or more of the amount of time, the level of the metric, or the percentage of the metric.

10. The computer-implemented method of claim 1, wherein:
    the autonomous vehicle and the one or more other autonomous vehicles are included in a fleet of autonomous vehicles.

11. The computer-implemented method of claim 1, wherein:
    a queue of autonomous vehicles comprises the autonomous vehicle and the one or more other autonomous vehicles;
    determining the status of the autonomous vehicle comprises determining a position of the autonomous vehicle in the queue; and
    depicting the status of the autonomous vehicle comprises depicting the position of the autonomous vehicle in the queue.

12. The computer-implemented method of claim 1, wherein:
    determining the one or more maintenance statuses comprises determining a location on the autonomous vehicle associated with a status; and
    depicting the at least one of the one or more maintenance statuses comprises depicting the status in a direction of the location.

13. The computer-implemented method of claim 1, wherein depicting the at least one of the one or more maintenance statuses comprises depicting the at least one of the one or more maintenance statuses at least in part through a rotatable portion of the display device.

14. The computer-implemented method of claim 1, wherein:

the display device comprises a rotatable portion of a light detection and ranging (LIDAR) device; and depicting the at least one of the one or more maintenance statuses comprises illuminating, based at least in part on a rotational frequency of the LIDAR device, one or more of a plurality of light-emitting elements affixed to the rotatable portion to display imagery depicting the at least one of the one or more maintenance statuses.

15. An autonomous vehicle comprising:

a display device affixed to an exterior of the autonomous vehicle and configured to display information associated with a plurality of systems such that the information is visible to an observer located outside of the autonomous vehicle and standing on a surface on which the autonomous vehicle is located irrespective of a position of the observer around the autonomous vehicle; and a computing system configured to perform operations comprising:

determining one or more maintenance statuses of one or more of the plurality of systems of the autonomous vehicle, wherein determining the one or more maintenance statuses comprises determining a status of the autonomous vehicle in relation to one or more other autonomous vehicles positioned alongside the autonomous vehicle; and causing the display device to depict at least one of the one or more maintenance statuses, wherein depicting the at least one of the one or more maintenance statuses comprises depicting the status of the autonomous vehicle in relation to the one or more other autonomous vehicles such that the status of the autonomous vehicle is distinguishable from one or more statuses depicted by the one or more other autonomous vehicles positioned alongside the autonomous vehicle.

16. The autonomous vehicle of claim 15, wherein determining the one or more maintenance statuses comprises determining one or more of a vehicle operational status, a vehicle health status, an energy level, a fuel level, an available range, an available operating time, a tire pressure, a status of a software update, a status of a data update, an error code, an identifier associated with a system fault, an identifier of the autonomous vehicle, an identifier of an individual associated with the autonomous vehicle, an identifier associated with a known problem, an identifier associated with a known solution, a status of an access-control system, whether the autonomous vehicle is physically connected to an external system, or an operational role of the autonomous vehicle within a fleet of autonomous vehicles.

17. The autonomous vehicle of claim 15, wherein:

the display device comprises a rotatable portion of a light detection and ranging (LIDAR) device; and the display device is configured to depict the at least one of the one or more maintenance statuses by illuminating, based at least in part on a rotational frequency of the LIDAR device, one or more of a plurality of light-emitting elements affixed to the rotatable portion to display imagery depicting the at least one of the one or more maintenance statuses.

18. A display device for an autonomous vehicle, the display device being configured to:

affix to an exterior of the autonomous vehicle; and display maintenance information associated with a plurality of systems such that the maintenance information is visible to an observer located outside of the autonomous vehicle and standing on a surface on which the autonomous vehicle is located irrespective of a position of the observer around the autonomous vehicle, wherein the maintenance information comprises the status of the autonomous vehicle in relation to one or more other autonomous vehicles positioned alongside the autonomous vehicle.

19. A system comprising the display device of claim 18 and one or more computing devices configured to perform operations comprising:

determining one or more maintenance statuses of one or more of the plurality of systems of the autonomous vehicle; and causing the display device to depict at least one of the one or more maintenance statuses.

20. The system of claim 19, wherein:

the display device comprises a rotatable portion of a light detection and ranging (LIDAR) device; and the display device is configured to depict the at least one of the one or more maintenance statuses by illuminating, based at least in part on a rotational frequency of the LIDAR device, one or more of a plurality of light-emitting elements affixed to the rotatable portion to display imagery depicting the at least one of the one or more maintenance statuses.

* * * * *